G. T. HORTON.
WATER TANK.
APPLICATION FILED MAY 5, 1911.

1,008,645.

Patented Nov. 14, 1911.
3 SHEETS—SHEET 1.

Witnesses:
J. H. Daggett
L. Christianson

Inventor:
George T. Horton.
by Hirschl & Hirschl
Attys.

G. T. HORTON.
WATER TANK.
APPLICATION FILED MAY 5, 1911.

1,008,645.

Patented Nov. 14, 1911.
3 SHEETS—SHEET 2.

Witnesses:
T. N. Daggett.
L. Christianson.

Inventor:
George T. Horton.
by Hirschl & Hirschl
Attys.

G. T. HORTON.
WATER TANK.
APPLICATION FILED MAY 5, 1911.
1,008,645.
Patented Nov. 14, 1911.
3 SHEETS—SHEET 3.
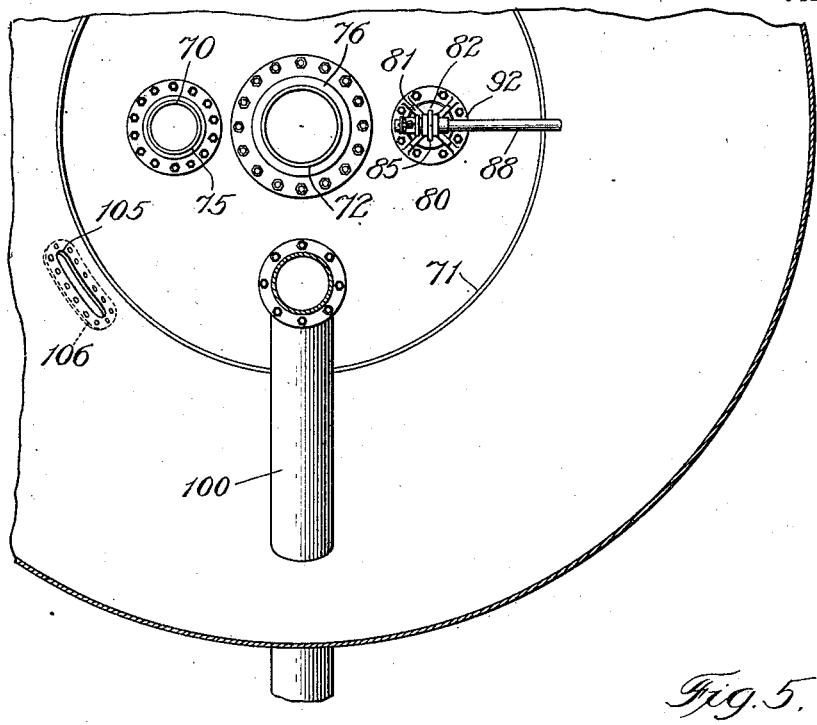
Fig. 4.
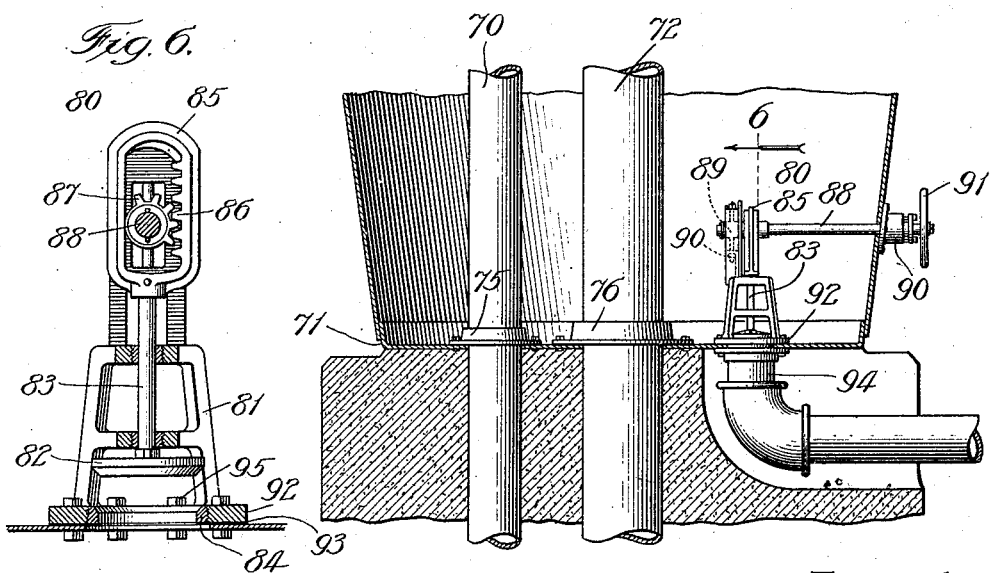
Fig. 6.
Fig. 5.
Witnesses:
Inventor:
George T. Horton.
By Hirschl & Hirschl
Attys.

UNITED STATES PATENT OFFICE.

GEORGE T. HORTON, OF CHICAGO, ILLINOIS.

WATER-TANK.

1,008,645.  Specification of Letters Patent.  Patented Nov. 14, 1911.

Application filed May 5, 1911. Serial No. 625,331.

*To all whom it may concern:*

Be it known that I, GEORGE T. HORTON, a citizen of the United States, residing at Chicago, in the county of Cook and State of Illinois, have invented a new and useful Improvement in Water-Tanks, of which the following is a specification.

This invention relates to water tanks and more especially to tanks which are designed to hold a large quantity of water, such as railway tanks.

In my prior United States Letters Patent No. 857,626 issued June 25, 1907, are set out some of the advantages and disadvantages of tanks with flat bottoms and tanks with hemispherical bottoms such as have heretofore been constructed; and also a description of a tank with a hemi-ellipsoid bottom. The tank which is hereinafter described is designed to combine the advantageous features of the tank illustrated in said prior patent in that it may contain a maximum quantity of water with a minimum depth, while being constructed of economical proportions; it possesses great strength and rigidity in proportion to the thickness of its walls; and it possesses the additional advantage over the hemi-ellipsoid bottom tank before mentioned in that the form of its bottom is such as to prevent mud and sediment from accumulating thereon and being washed into the outlet valve. Said tank is supported upon legs or columns, and its bottom is additionally supported by resting upon a large central settling basin, or mud-drum; and the total weight of the tank and its contents is so distributed as to remove a large part of it from the supporting columns and place it upon the settling basin, and the maximum strength of bottom in proportion to its thickness is secured by making said mud-drum or settling basin of large diameter at its upper end. At the same time economy in material may be effected, and other advantages secured, by making said settling basin smaller at its lower end.

Figure 1:
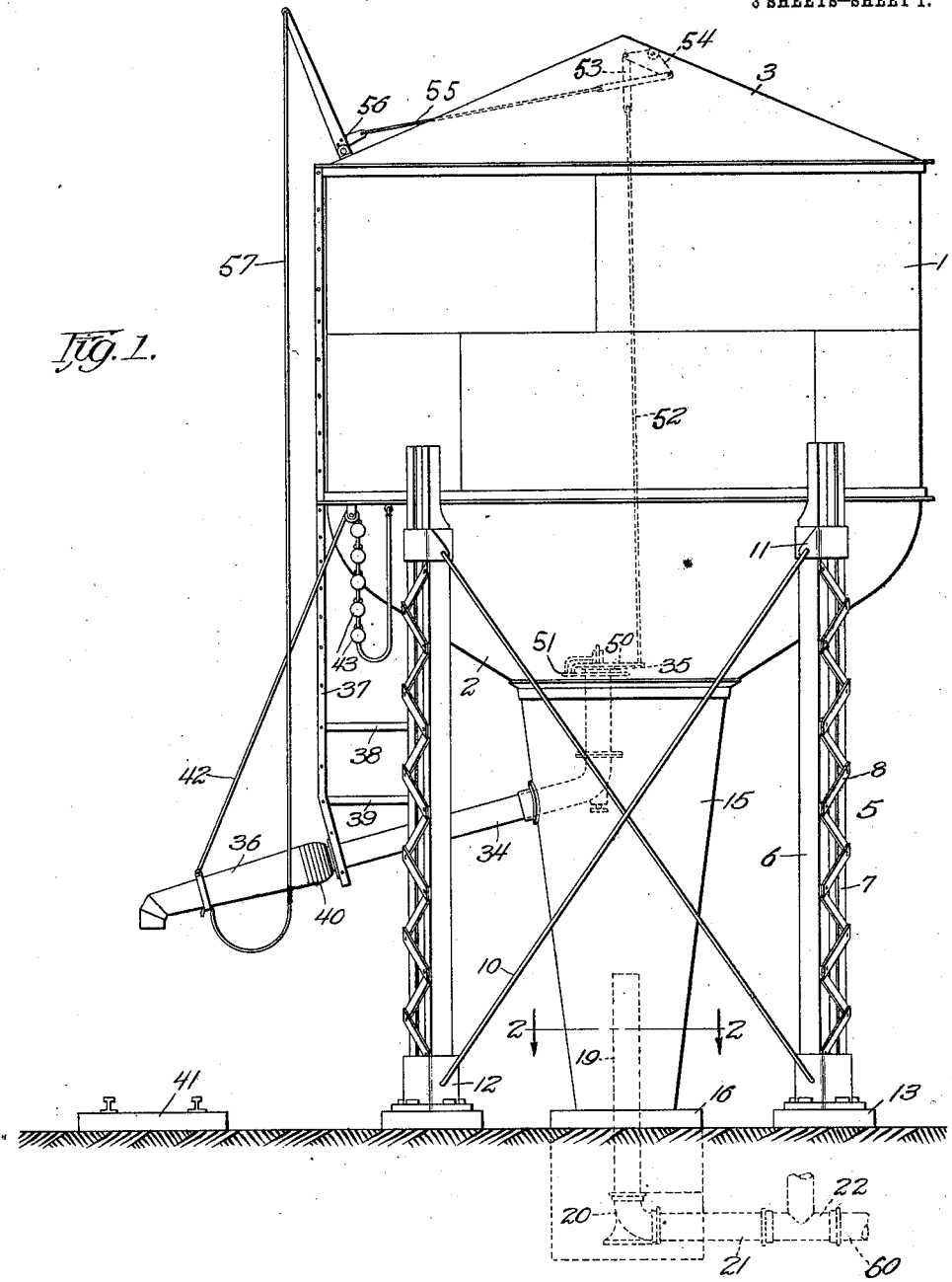
Figure 2:
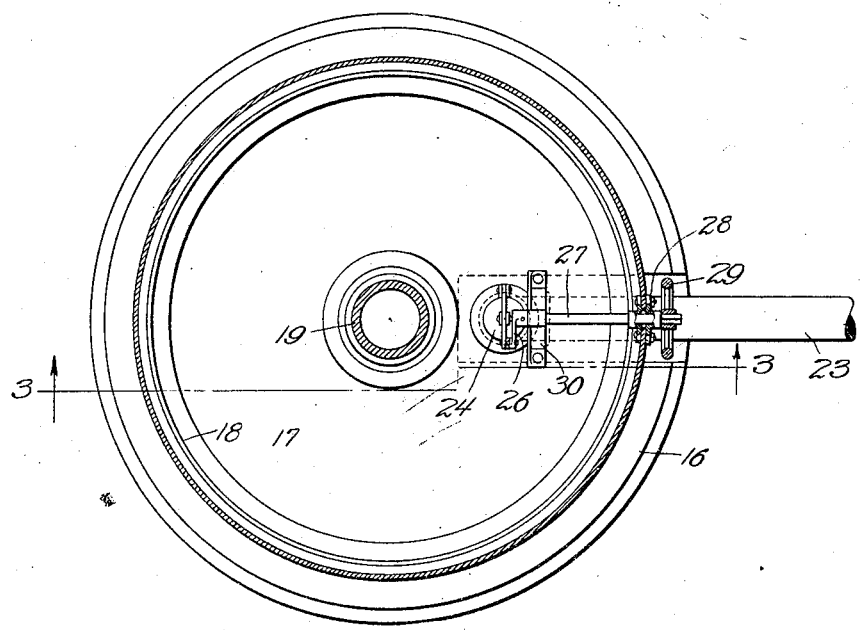
Figure 3:
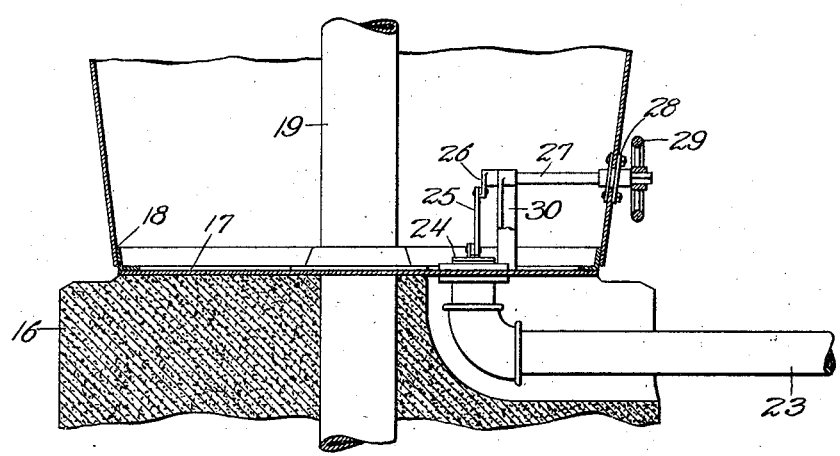

A form of tank embodying the improved features of construction above outlined is illustrated in the accompanying drawings in which:

Figure 1 is a view in elevation of said tank; Fig. 2 is an enlarged horizontal section through the mud-drum, or inlet pipe, taken on line 2—2 of Fig. 1; Fig. 3 is an enlarged detail section taken on line 3—3 of Fig. 2. Fig. 4 is a horizontal section taken in the plane of the upper end of the settling basin, showing a modified form of construction, and the parts differently arranged. Fig. 5 is a view similar to Fig. 3, but showing such modified form of construction. Fig. 6 is a vertical section on the line 6 of Fig. 5.

As shown in said drawings, in Figs. 1, 2 and 3, 1 indicates the body of the tank which is cylindrical in form and preferably constructed of sheet metal in the form of large rectangular plates, cylindrically curved and riveted together at their meeting margins in the manner heretofore employed in constructing similar tanks. A bottom portion 2, which is more particularly described hereinafter, is similarly formed of curved plates. A top or cover 3, may also be provided, being here shown substantially cone-shaped and formed of sheet metal plates in the same manner as the rest of the tank. Supporting legs or columns 5, comprising channel bars 6 and 7, having suitable lacings 8 connecting the same together, are provided, and these supporting legs are riveted at their upper ends to the sides of the tank. A recess, corresponding to the shape of the tank, is provided in the upper end of each of the channel bars 6 and 7, in order that the latter may set closer to the tank and support its weight upon their centers, instead of upon their inner edges. Suitable braces 10 are fastened at their upper ends to plates 11, secured to the supporting legs, and at their lower ends to plates 12, secured to the lower ends of the supporting legs. The lower ends of the supporting legs rest upon stone or cement blocks 13. In this manner a strong and rigid support is provided for the tank, which will sustain the weight of the same when it is filled with water. A large central settling basin 15 extends from the central portion of the said curved bottom 2 to a suitable base or support 16. Said settling basin is likewise constructed of curved plates, being circular in cross-section, and is preferably smaller in diameter at its lower end than at its upper end. Its upper end meets the surface of said bottom 2 in a circle of large diameter and the circular area of the bottom of said settling basin 15, as here shown, is relatively smaller; the dimensions of the settling basin being varied according to the climate of the vicinity in which the tank is located. Said settling basin is at all times made of such size that the water contained therein will not entirely freeze up. By making this portion of the tank large in diameter, although the water which is nearest to its walls may freeze, there is always left a center opening which permits water to flow into the tank and to be withdrawn therefrom. The enlarged diameter of said settling basin at its upper part places a large proportion of the weight of the tank and its contents upon the base or support 16, removing it from the supports 5, whereby the latter may be made considerably smaller than would otherwise be practicable. The form of said bottom 2 is substantially as follows: It is evident that, if the tank shall contain a maximum quantity of water for a minimum depth, the same must be large in diameter with respect to its height. It is also evident that a curved bottom which shall meet said tank at its upper edge and rest upon a settling basin, or similar central support, such as is described in my said prior patent, and shall also contain a minimum depth of water, must be relatively large in diameter with respect to its height. A hemi-ellipsoid bottom is so shaped, but it has the disadvantage of being comparatively flat in its center portion and allowing mud and sediment to accumulate thereon. Such flat portion is also, by reason of its shape, less strong than the other portions of the bottom. In order to overcome these disadvantages and still preserve the advantages found in such a shaped bottom, as set out in my prior patent, I have made the upper portion of the bottom 2 substantially ellipsoidal in shape, but the curve of such ellipsoid, instead of continuing thence downward and meeting the settling basin 15 in the center thereof, is continued in a direction more steeply inclined to the horizontal, being, as here shown, modified into the form of a cone; whereby the portions of said bottom adjacent to the central opening are comparatively steep and will not allow mud and sediment to accumulate upon them. In order also to place a large proportion of the weight upon the center support or base 16, and to preserve the economical dimensions of the bottom 2, its central opening is made very large, said bottom meeting the settling basin 15 in a circle of large area; and the economical dimensions of said settling basin 15 are preserved by making it of smaller diameter at its lower end, as above stated. A bottom 17 is adapted to rest upon the base 16 and is connected with the sides of the settling basin by means of the angle-piece 18, which forms a water tight joint between the two sections. An opening is formed in the bottom, through which is adapted to pass the supply pipe 19. This pipe preferably extends downwardly through the cement base 16 and is provided with an elbow 20, whereby the same is connected with a supply pipe 21, a suitable T-joint 22 being formed in said pipe for the purpose of connecting the same with the water main or other water supply. The supply pipe 19 is of sufficient length to extend any desired distance up into the settling basin 15; or if desired, all the way into the tank—the purpose of this construction being to prevent mud and sediment which may have accumulated in the bottom of the settling basin from being disturbed by the inflow of water through said supply pipe. A second opening is formed in the bottom 17 of the settling basin, which communicates with a blow-off pipe 23, a suitable valve 24 being seated in the opening in the settling basin which normally maintains the blow-off pipe closed. Said valve is operated through a link 25 attached to a crank 26 on the end of a horizontal shaft 27 which passes through a stuffing box 28 in the wall of said settling basin and is provided at its outer end with a hand wheel 29. A bracket member 30 supports the inner end of said shaft in a suitable bearing at its upper end.

At the upper end of the settling basin, or in the bottom of the tank, is provided a discharge pipe 34 which enters through an opening in the wall of the settling basin and extends into the latter far enough to escape any possibility of the water freezing around its inner end. A valve 35 serves to normally maintain this pipe in a closed position except when it is desired to supply water to an engine. The pipe 34 communicates with a suitable hinged water spout 36 through which the water is supplied. Said water spout 36 is hinged at its inner end to a pair of depending bracket members in the form of an iron ladder 37 which are attached to the circular base of the tank above and are braced at their lower portions by means of horizontal braces 38 and 39 extending to the adjacent legs of the tank. These latter members likewise afford means for a man to climb up the lattice work of one of the legs and cross over to said ladder in order to reach the top of the tank for inspection and repairs. The inner end of said spout 36 is formed with a spherical enlargement 40 into which the end of the discharge pipe 25 extends for a short distance, whereby the water is conducted from the end of said discharge pipe into said spout while permitting of their relative angular adjustment. The outer end of said spout extends a sufficient distance to reach the tender of an engine which may be placed on a track 41 adjacent thereto. Normally the spout 36 is maintained in a position drawn upward in order to afford free passage for the engines beneath it, a rope or cable 42 being connected to its outer end and passing over a pulley upon the tank above. Said rope or cable is thence looped downward and attached to said tank at a point near said pulley, its looped portion being provided with a number of counter-weights 43; whereby said spout, when released, is drawn upward until a point of equilibrium is reached with said weights substantially at the bottom of their supporting loop, and the upward movement of said spout is arrested without shock or jerk. When it is desired to feed water to an engine this spout may be drawn downward until its outer end is in the desired position with respect to the opening into the engine tank.

The valve 35 is normally closed and I have provided suitable means for opening the same when it is desired to supply water to the engine. Said valve is operated through a valve arm 50, one end of which is pivoted upon a suitable support 51 and the other end of which is connected by a rope or cable 52 passing through the tank and connected by the link 53, with one end of a bell crank lever 54, pivoted in the top 3. The other end of the bell crank lever is connected by a rope or cable 55, with a second bell crank lever 56, pivoted upon the outside of the tank. One end of the bell crank lever 56 has depending therefrom a pull rope or cable 57, which extends down within convenient reach of a person standing upon the tender of an engine. When the engine is in position to receive water from the discharge spout 36, the engineer or attendant, by pulling upon the cable 57, will open the valve 35 and permit the water to rush through the discharge pipe 34 and spout 36 into the water tank of the engine.

In the event it is desired to use a crane connection with the tank and have the crane situated some distance from the tank, the supply pipe 21 may be provided with an extension 60, which leads to the crane spout, the supply pipe being then used as a discharge pipe, as well as for supplying water to the tank. By having the supply pipe extend up some distance into the settling basin, as shown, it will be noted that when the water is drawn off, or pumped in, sediment which may have settled in the bottom of the settling basin will not be disturbed.

By the arrangement of the blow-off pipe 23, and valve 24, in the bottom of the settling basin 15, it will be seen that all mud and other sediment in the water will settle in the bottom of said settling basin, and by opening the valve 24 this mud may be readily blown out by the force of the water rushing through it; whereby it becomes unnecessary to empty the entire tank to remove the sediment, as is the case where the sediment is allowed to settle in the bottom of the tank.

In Figs. 4, 5 and 6 is shown a modified form of construction of the settling basin, employing a separate supply pipe and outlet pipe through its bottom, where it is desired to supply a crane connection from the tank, and it is not considered desirable to supply water to the tank and withdraw it through the same pipe, because of "hammering" or other difficulty. As shown in said figures, a supply pipe 70 enters the settling basin, passing through its bottom 71, and a relatively larger outlet pipe 72 also passes through said bottom. Either or both of these pipes may rise any desired distance in the settling basin, or may lead entirely to the top of the same, in order to avoid agitation of the sediment in the bottom of the settling basin by the inflow and outflow of water through said pipes. They are shown provided with flanged collars, 75 and 76 respectively, surrounding their portions adjacent to the bottom 71, which collars are adapted to be secured to said bottom by bolts or otherwise; and the annular space between each pipe and its surrounding collar may be filled with lead in order to provide a water tight joint through the bottom of the settling basin. A blow-off opening, corresponding to the blow-off opening shown in Figs. 2 and 3, is also provided in said bottom 71; but, as an additional modification, said blow-off opening is shown as controlled by a rack-and-pinion operated valve 80. In detail, said valve, as here shown, comprises a frame or valve stand 81 secured to the bottom of the settling basin, and a circular valve disk 82, secured to a sliding valve arm 83 guided in said frame, and adapted to seat upon a valve seat 84 which is fitted into a circular opening through the bottom of said frame. To the upper end of the valve arm 83 is secured a link-shaped member 85, provided upon its inner surface with rack teeth, 86, which engage with a pinion 87 arranged within said member and affixed to the inner end of a horizontal shaft 88. The latter passes through said member 85 and is journaled in a bearing block 89, supported in a bracket member 90 which rises from the valve frame 81. Said shaft 88 passes through the wall of said settling basin, to which is secured a stuffing box 90, and its outer end is provided with a hand wheel 91 by means of which the valve may be operated. The lower end of the valve frame 81 is made in the form of a circular plate or radial flange 92 adapted for bolting to the bottom of the settling basin. A gasket 93, of lead or other material, is interposed between said parts. Immediately below the valve opening is attached a short length of pipe 94, flanged at its upper end and adapted to be secured by bolts 95 which pass through its flange and likewise the flange 92; whereby all of these parts are secured in place. Said pipe 94 may connect with an elbow as indicated, or be provided with other fittings in order to conduct the discharged water away from the tank, as desired.

A discharge pipe 100, corresponding to the discharge pipe 34, is shown, but so arranged that its inner portion lies above a portion of the settling basin not occupied by the pipes 70 and 72 in order to afford room for the accommodation of the parts when said pipes 70 and 72 are carried upward to the height of said discharge pipe 100.

A manhole 105, with a removable cover 106, is also shown at the foot of the settling basin, whereby access may be had to its interior.

I claim as my invention:

1. The combination with a water tank, of a bottom therefor, ellipsoidal in its upper portion and steeply inclined in its lower portion, and a tapering settling basin for said tank, said settling basin also serving as a support for said bottom.

2. The combination with a water tank having a bottom ellipsoidal in its upper portion and steeply inclined in its lower portion, of suitable supports for said tank, and a tapering settling basin entering the bottom of said tank and also serving as a support for said tank.

3. The combination with a water tank, of a bottom therefor ellipsoidal in its upper portion and having a large central opening, the marginal portions thereof adjacent to said opening being inclined at a large angle to the horizontal, and a tapering settling basin entering said bottom and also serving as a support for said bottom and said tank.

In witness whereof, I have hereunto set my hand in the presence of two witnesses, this 29th day of April, 1911.

GEORGE T. HORTON.

Witnesses:
  C. S. PILLSBURY,
  F. C. AMES.